United States Patent
Ramachandran et al.

(10) Patent No.: US 11,949,650 B2
(45) Date of Patent: Apr. 2, 2024

(54) SYSTEM AND METHOD FOR IMPROVING NETWORK PERFORMANCE WHEN USING SECURE DNS ACCESS SCHEMES

(71) Applicant: HUGHES NETWORK SYSTEMS, LLC, Germantown, MD (US)

(72) Inventors: Ganeshan Ramachandran, Germantown, MD (US); Robert Torres, Germantown, MD (US); George Choquette, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 239 days.

(21) Appl. No.: 16/685,943

(22) Filed: Nov. 15, 2019

(65) Prior Publication Data

US 2021/0092088 A1     Mar. 25, 2021

Related U.S. Application Data

(63) Continuation-in-part of application No. 16/583,004, filed on Sep. 25, 2019, now Pat. No. 11,438,763.

(51) Int. Cl.
| | |
|---|---|
| H04L 29/06 | (2006.01) |
| H04L 61/4511 | (2022.01) |
| H04W 84/06 | (2009.01) |

(52) U.S. Cl.
CPC ......... *H04L 61/4511* (2022.05); *H04W 84/06* (2013.01)

(58) Field of Classification Search
CPC .................. H04L 61/1511; H04W 84/06
(Continued)

(56) References Cited

U.S. PATENT DOCUMENTS

| 8,549,148 B2 | 10/2013 | Devarapalli et al. |
| 9,660,998 B1 | 5/2017 | Sethi |

(Continued)

FOREIGN PATENT DOCUMENTS

WO     2012/061243 A1     5/2012

OTHER PUBLICATIONS

Orhan, "Configuration and device identification on network gateways", 2013, Iteno, pp. 1-24 (Year: 2013).*

(Continued)

*Primary Examiner* — Piotr Poltorak
*Assistant Examiner* — Gregory A Lane
(74) *Attorney, Agent, or Firm* — Potomac Technology Law, LLC

(57) ABSTRACT

A system and method for improving network performance of DNS queries. The system includes a terminal which receives DNS queries from a customer premise equipment (CPE), and supplies matching DNS records in response to the queries. The terminal monitors all traffic from the CPE and generates a preload list containing domains and a time schedule at which name resolution should be requested for the domains. A DNS preload client in the CPE receives the preload list from the terminal, and submits preload DNS queries for name resolution of domains contained in the preload list at times specified in the time schedule. Preload records supplied in response to the preload DNS queries are stored by the CPE and used to resolve DNS queries from applications installed on the CPE.

18 Claims, 11 Drawing Sheets

(58) Field of Classification Search
USPC .......................................................... 713/151
See application file for complete search history.

(56) References Cited

U.S. PATENT DOCUMENTS

| | | | |
|---|---|---|---|
| 2003/0172183 A1* | 9/2003 | Anderson, IV | H04L 61/5014 709/230 |
| 2004/0073707 A1* | 4/2004 | Dillon | H04L 61/4552 709/245 |
| 2005/0259645 A1 | 11/2005 | Chen et al. | |
| 2011/0058657 A1* | 3/2011 | Alegret | H04N 7/17318 379/32.04 |
| 2012/0179801 A1* | 7/2012 | Luna | H04L 61/58 709/223 |
| 2012/0297087 A1* | 11/2012 | Humble | H04L 61/2589 709/238 |
| 2019/0215166 A1 | 7/2019 | Prince et al. | |

OTHER PUBLICATIONS

International Search Report and Written Opinion issued in PCT/US2020/052427, dated Feb. 8, 2021.
International Search Report and Written Opinion issued in PCT/US2020/060445, dated Feb. 12, 2021.

* cited by examiner

SYSTEM AND METHOD FOR IMPROVING NETWORK PERFORMANCE WHEN USING SECURE DNS ACCESS SCHEMES

CROSS-REFERENCE TO RELATED APPLICATION

The present application is a Continuation in Part of U.S. application Ser. No. 16/583,004 filed Sep. 25, 2019, the entire disclosure of which is incorporated herein by reference.

BACKGROUND INFORMATION

The packet switched networks are increasingly used by voice and data communication systems. Such networks include private networks accessible only to authorized personnel. Packet switched networks also include public networks, such as the internet, which are accessible to consumers via providers such as an internet service provider (ISP), wireless (cellular) service provider, etc. For example, many consumers interact with news-oriented websites in order to obtain information such as current events, sports, weather, traffic, etc. using a web browser operating on devices capable of accessing the internet. Consumers also interact with recreational websites in order to access social media, music streaming services, video streaming services, etc.

Consumers typically enter a request for a web address in the web browser in order to establish a communication link with the desired website. The request often includes, in part, information related to the website such as a business name, service name, etc. (e.g., "www.businessname.com"). With the exception of consumer devices, however, website locations are identified and accessed using numeric internet protocol (IP) addresses. In order to access a particular website, the web address supplied by the consumer must be matched to, or translated into, its actual IP address. The web browser transparently performs this task by submitting a domain name system (DNS) request for (web) address translation to an external entity. For example, DNS servers (or authoritative DNS servers) function as entities which store and maintain information to the relationship between web addresses and IP addresses. The DNS server examines the web address contained in the request for address translation, and returns a matching IP address to the web browser. The web browser subsequently utilizes the IP address to establish a connection, thus allowing the consumer to access the desired information. Depending on the particular website, the IP address may expire and/or change. Accordingly, it is necessary to obtain the current (and valid) IP address from the DNS server in order to access the web site.

While the use of DNS requests (or DNS queries) has allowed consumers to access websites using names that can be easily remembered due to their relationship with established brands and/or services, they have also opened security breaches that can be exploited by third parties. For example, DNS requests (or queries) can be intercepted by third parties who supply a false IP address to the web browser or user device. When a connection is established, malicious software can be installed on the user device in order to access personal and/or security information. Various techniques, such as encryption, have been proposed to address some of these vulnerabilities. For example, security protocols have been proposed to encrypt information contained with requests for DNS resolution, and response from the DNS server.

Certain wireless communication systems, such as satellite communication system, implement caching clients within satellite terminals deployed at consumer locations and/or satellite gateways. The caching clients function to reduce latency associated with transmission to/from the satellite. For example, a caching client can be configured to store copies of IP addresses associated with DNS requests. When a DNS request is received at the satellite terminal, the caching client supplies a stored IP address to the user device. Thus, the latency associated with transmission of the DNS request to/from the satellite and subsequently to the DNS server can be eliminated.

Secure DNS protocols, such as domain name system security extensions (DNSSEC), can potentially preclude the use of caching clients, because the DNS responses are digitally signed to ensure authenticity of the information and its source. While it is possible to view the contents, the actual DNS records cannot be modified to optimize caching techniques. Thus, only records which match queries originating from a customer device would be accepted as authentic, thereby reducing or eliminating the benefits associated with a caching client and producing significant latency. Based on the foregoing, there is a need for an approach for implementing caching techniques that can be used with either conventional DNS protocols or secure DNS protocols (such as DNSSEC) without the need to communicate with the DNS server for each request.

BRIEF SUMMARY

A system and method are disclosed for improving network performance when using conventional or secure DNS access schemes. According to an embodiment, the system includes a terminal of a satellite communication system and a DNS preload client associated with a customer premise equipment (CPE). The terminal is configured to: receive DNS queries from a customer premise equipment (CPE), supply DNS records to the CPE in response to the DNS queries, perform an analysis of DNS queries received from the CPE having an assigned internet protocol (IP) address as a source IP address parameter, DNS records supplied to the CPE with the assigned IP address as a destination IP address parameter, and network activity of the CPE, and generate a preload list containing domains and a time schedule at which name resolution should be requested for the domains, wherein the preload list is based, at least in part, on the analysis. The DNS preload client being configured to: receive the preload list from the terminal, and submit preload DNS queries for name resolution of domains contained in the preload list at times specified in the time schedule, wherein the DNS preload client submits the preload DNS queries via the CPE. Preload records supplied in response to the preload DNS queries are stored within a DNS cache of the CPE, and preload records stored in the DNS cache of the CPE are usable to resolve DNS queries from applications installed on the CPE.

According to another embodiment, the method includes: receiving DNS queries, from a customer premise equipment (CPE), at a terminal of a satellite communication system; supplying DNS records to the CPE in response to the DNS queries; analyzing DNS queries received from the CPE having an assigned internet protocol (IP) address as a source IP address parameter, DNS records supplied to the CPE with the assigned IP address as a destination IP address parameter, network activity of the CPE; generating a preload list containing domains and a time schedule at which name resolution should be requested for the domains, wherein the preload list is based, at least in part, on the analysis; transmitting the preload list to a DNS preload client within the CPE; submitting, by the DNS preload client, preload DNS queries for name resolution of domains contained in the preload list at times specified in the time schedule, wherein the DNS preload client submits the preload DNS queries via the CPE; and storing preload records supplied in response to the preload DNS queries within a DNS cache of the CPE, wherein the preload records stored in the DNS cache of the CPE are usable to resolve DNS queries from applications installed on the CPE.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

A system and method for improving network access when using conventional or secure DNS access schemes, are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
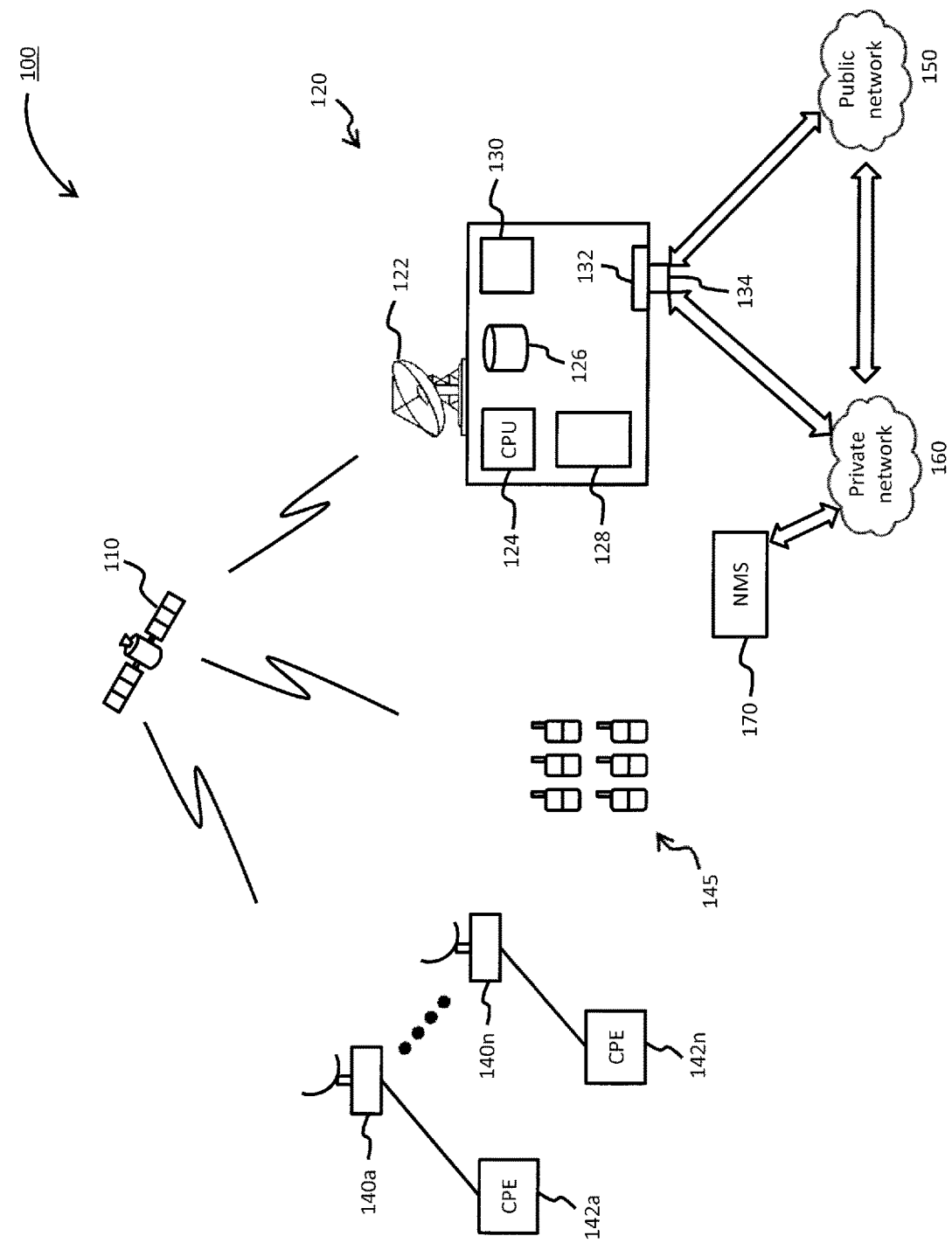
FIG. 1 is a diagram of a system capable of providing of voice and data services, according to at least one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140*a*-140*n*. Each satellite terminal (or terminal) 140 can be configured for relaying traffic between its customer premise equipment (CPEs) 142*a*-142*n* (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the satellite terminal. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public internet 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the CPU 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
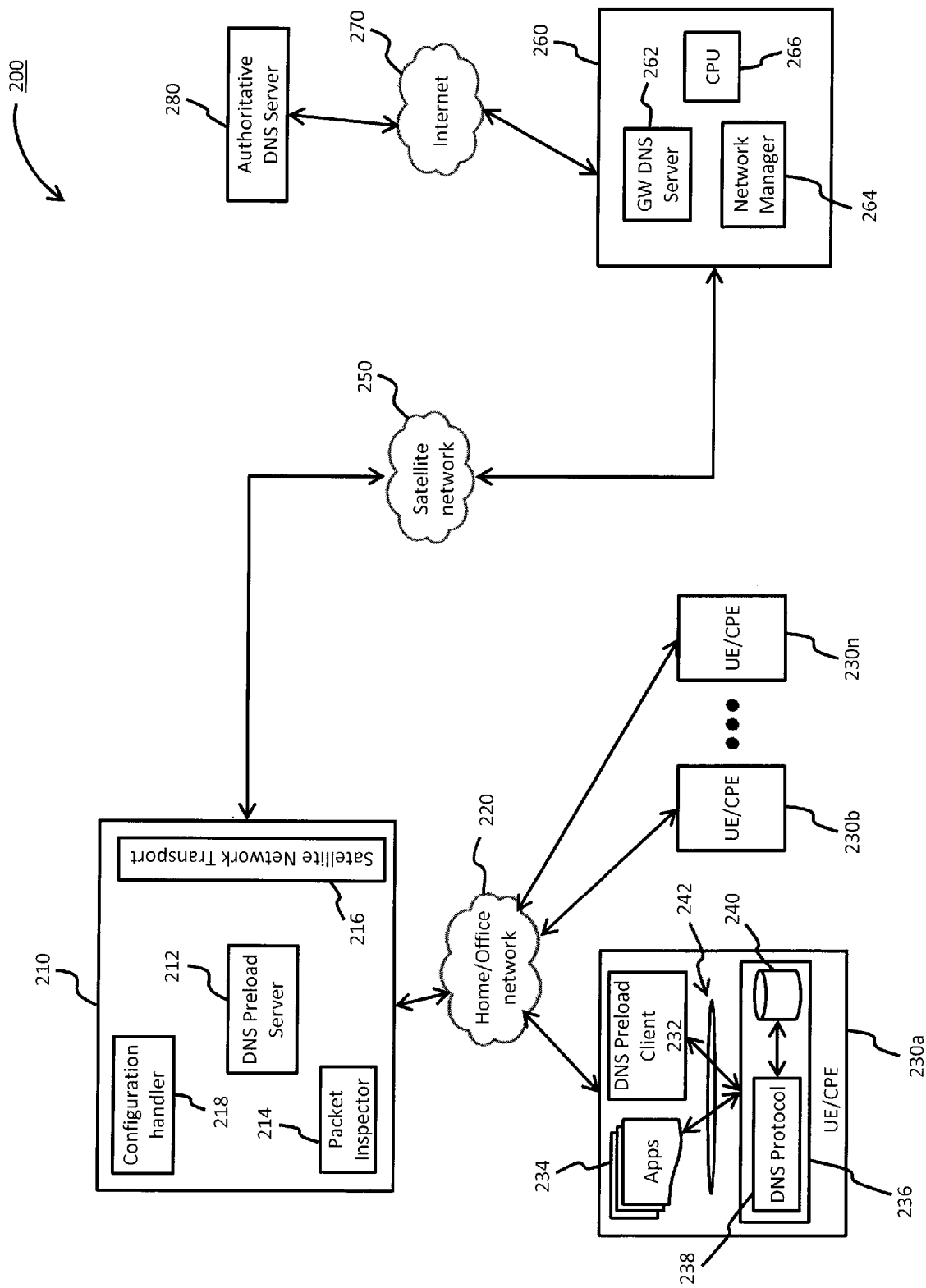
FIG. 2 is a diagram of a system for improving network performance using a DNS preload client, according to various embodiments.

FIG. 2 illustrates a system 200 for improving DNS access, in accordance with various embodiments. The system 200 includes a terminal 210 configured to establish communication with a gateway 260 via a satellite network 250 (or satellite link), and exchange various types of information. The information exchanged between the terminal and the gateway can include, without limitation, voice, data, control signals, etc. According to the illustrated embodiment, the terminal 210 includes a DNS preload server 212, a packet inspector 214, a satellite network transport unit 216, and a configuration handler 218. Although not illustrated in FIG. 2, the terminal 210 can further include one or more processing units configured to control and/or assist in performing various operations. Furthermore, components such as the DNS preload server 212, packet inspector 214, satellite network transport 216, and configuration handler 218 can also incorporate processing units and/or co-processors in order to perform various tasks, as will be described in greater details below.

According to at least one embodiment, the DNS preload server 212 is configured to monitor, process, and/or improve DNS search performance. The DNS preload server 212 interacts with DNS preload clients 232 installed on the individual customer premise equipment (CPEs) 230a-230n to track DNS request and DNS response activity, and intelligently derives correlation between the domains accessed and the time accessed. The DNS preload server 212 also tracks the expiration time of DNS records based, in part, on the time to live (TTL) information contained in the DNS record. The DNS preload server 212 subsequently generates, or updates, a preload list for each CPE 230. The preload list contains the domain names and a time schedule/plan at which the DNS preload client 232 should submit a request for name resolution. Table 1 (below) illustrates an exemplary preload list.

TABLE 1

| Time | (Date) | Domain(s) |
| --- | --- | --- |
| 8:10 | Nov. 15, 2019 | www.domain1.com, www.domain2.net, www.domain3.net, www.domain4.com, www.domain5.com, . . . |
| 8:30 | Nov. 15, 2019 | www.domain1.com, domain2.net |
| 10:00 | Nov. 15, 2019 | www.domain1.com, www.domain4.com, www.domain5.com |
| 12:00 | Nov. 15, 2019 | www.domain2.net, www.domain3.net |
| 21:00 | Nov. 15, 2019 | www.domain1.com, www.domain2.net, www.domain3.net, www.domain4.com, www.domain5.com |

The preload list includes a first entry scheduled for 8:10. The date can optionally be include, for example, as Nov. 15, 2019. The first entry in the preload list also specifies five (5) domain names that should be submitted for resolution. Accordingly, at 8:10, the DNS preload client 232 would submit DNS queries for the five domain names. The DNS preload client 232 would then wait until the time specified in the second entry to submit the next DNS query. As shown in Table 1, the second entry in the preload list only specifies two domain names for resolution. The DNS preload client 232 would continue processing the preload list by submitting DNS queries until reaching the final entry at 21:00. As shown in Table 1, each entry in the preload list can contain different domains. Depending on the particular CPE and level of network activity, a new preload list may be provided to the DNS preload client 232 prior to reaching the final entry (at 21:00). Under such circumstances, the current preload list would be discarded, and the DNS preload client 232 would begin processing new preload list.

According to various embodiments, the time schedule can be derived, in part, by tracking the DNS requests/responses, traffic activity, and the TTL of the name resolutions. Furthermore, the time schedule can be adjusted to ensure that the DNS preload client 232 submits the DNS queries from the preload list prior to the actual applications 234 requesting resolution of any domain names contained in the preload list. According to further embodiments, the DNS preload server 212 can be configured to monitor domains contained in the preload list for subsequent network traffic (e.g., exchange of TCP/UDP packets). Domains that did not generate additional user traffic activity, following name lookup, are removed from the preload list. Such embodiments can ensure that the preload list contains domains that are actually used by the applications 234.

The satellite network transport unit 216 is configured to provide transport path between the terminal 210 and the Gateway 260. Although not illustrated in FIG. 2, the satellite network transport unit 216 can include a combination of hardware and/or software components which interact to facilitate the transport path between the terminals 210 and the gateway 260. According to various embodiments, the satellite network transport unit 216 can be configured to optimize information exchange over the satellite link 250. For example, the satellite network transport unit 216 can implement performance enhancing proxies (PEP) to improve transmission efficiency. Depending on the specific implementation, various PEP techniques can be used to transmit information over the satellite link 250 instead of conventional TCP/IP packets. The configuration handler 218 includes various components (not shown), implemented as hardware and/or software combinations that interact with the terminal 210 and gateway 260 to provide necessary configuration information necessary.

According to at least one embodiment, the terminal 210 can perform various functions associated with connecting customer premise equipment (CPE) 230a-230n (collectively 230) to the gateway 260 for subsequent access to private networks or a public network such as the internet 270. For example, the terminal 210 can interconnect a plurality of CPEs 230 via a home or office network 220, and facilitate communication with the gateway 260 via the satellite link 250. According to the embodiment illustrated in FIG. 2 the home network 220 can be established using one or more separate components such as routers, switches, etc. According to other embodiments, however, the terminal 210 can incorporate routing, switching, and other networking functions internally. For example, the terminal 210 can incorporate multiple ethernet ports for establishing a wired connection to various CPEs 230. The terminal 210 can further incorporate wireless transceivers (not shown) for establishing wireless communication links with certain types of CPEs 230 such as mobile phones, tablets, notebooks, etc.

As illustrated in FIG. 2, CPE230a can include, in part, a DNS preload client 232, and one or more installed applications 234. A DNS services system 236 can also be included in CPE230a for managing all aspects of domain resolution required by CPE230a. Thus, requests for domain name resolution (i.e., DNS requests) are submitted from the different applications 234 to the DNS services system 236, and matching DNS records are supplied to the applications 234 from the DNS services system 236. According to the illustrated embodiment, the DNS services system 236 also includes a DNS protocol unit 238 capable of implementing standard DNS protocols as well as domain name system security extensions (DNSSEC). Thus, the DNS protocol unit 238 can be configured to digitally verify all DNS responses in accordance with DNSSEC protocols.

In general, DNSSEC applies security techniques such as public/private key encryption to facilitate authentication of both the data and source (i.e., sender) of information being exchanged. DNS queries and records can be accepted as authentic if the data and sender can be verified based, in part, on the digital signature. The data being exchanged using DNSSEC remains accessible in text format, thereby allowing the packet inspector 214 and DNS preload server 212 to examine parameters of DNS queries received from the CPE 230 and DNS records supplied from the gateway 260. Any tampering or modification of the data, however, would result in a data authentication failure and/or a sender authentication failure.

The DNS services system 236 also includes a storage unit 240 capable of storing information usable for processing and/or resolving various requests for domain name resolution (i.e., DNS requests). The storage unit 240 can store, for example, a list of unexpired DNS records (or simply records) that can be used to resolve DNS queries received from the applications 234. Depending on the specific implementation, the storage unit 240 can be in the form of various combinations of hardware and software designed to optimize data/information storage and retrieval. For example, the storage unit 240 can be in the form of a solid-state storage device, standard non-volatile memory, high performance cache storage, etc.

According to an embodiment, the DNS preload client 232 can be in the form of a light weight application that is resident on the CPE 230a (i.e., user device) and configured to function on the same operating system platform (e.g., iOS, Android, Windows, LINUX, MacOS etc.) The DNS preload client 232 is configured to request name resolution (i.e., DNS requests) for domains contained in the preload list, using platform specific application programming interfaces (APIs) 242, for domains that are likely to be used by other applications 234 running on CPE 230a. After submitting the DNS requests (or queries) for domains from the preload list, the DNS preload client 232 does not use information contained in the resulting DNS record to initiate further network traffic. Rather, name resolution for preload list entries are only requested, or initiated, in order to store the results in the storage unit 240 (e.g., DNS cache) maintained by the specific DNS services system 236. The domains that are to be resolved by DNS request submitted from DNS preload client 232, and the time at which they are to be requested, is supplied by the DNS preload server 212 in the satellite terminal 210. According to various embodiments, the DNS protocol unit 238 can be configured to apply DNSSEC protocols to DNS requests submitted by the preload client 238. Matching DNS records received and saved in the storage unit 240 are also digitally signed in accordance with DNSSEC protocols.

The DNS preload client 232 is configured to implement platform specific schemes for detecting the presence of the DNS preload server 212 and establishing a connection that can be used, in part, to receive the preload list. According to various embodiments, the DNS preload client 232 can optionally supply information to assist the DNS preload server 212 in customizing the preload list. For example, the DNS preload client 232 can be configured to probe the CPE 232a and identify currently installed applications 234. The DNS preload client 232 can further determine the frequency with which each application 234 is used, when applications 234 are installed or deleted etc.

As previously discussed, the terminal 210 facilitates communication between the CPEs 230 and various public and private networks such as the internet 270. More particularly, the terminal 210 transmits and receives traffic to/from the gateway 260 using the satellite network 250. The gateway 260 subsequently forwards user traffic to/from the external network 270. According to various embodiments, all traffic over the satellite network 250 is encrypted using predetermined security protocols in order to minimize and/or eliminate data access by unauthorized parties. The encryption can be applied at different layers (e.g., layer2, layer3, etc.), depending on the specific implementation.

As illustrated in FIG. 2, the gateway 260 can include a gateway DNS server 262, a network manager 264, and one or more CPU 266. It should be noted, however, that the gateway 260 can be optionally configured to operate without the gateway DNS server 262. In such implementations, DNS queries from the terminal 210 are received at the gateway 260, and forwarded directly to the authoritative DNS server 280. According to one or more embodiments, the CPU 266 can be configured to provide some or all of the functionality of the components within the gateway 260. According to other embodiments, the CPU 266 can be configured to supplement operation of other components within the gateway 260 by reallocating excess computational resources, when available. The gateway 260 can further include various hardware and software components (not shown) necessary to facilitate normal operations. For example, the gateway 260 can include a radio frequency transceiver for transmitting and receiving information over the satellite network 250. The gateway 260 can further include one or more interfaces for establishing connections to various internal components, as well as terrestrial network connections. The terrestrial connections can facilitate, for example, communication between the gateway 260 and the authoritative DNS server 280 via the internet 270. According to various embodiments, the network manager 264 can be configured to generate and distribute configuration information and/or profiles to various components (e.g., terminals, CPEs, etc.) in the system 200.

According to one or more embodiments, the system 200 illustrated in FIG. 2 improves performance of CPEs 230 when DNS queries must be resolved, particularly if DNS responses are digitally signed in accordance with DNSSEC protocols. For example, when an application 234 requires access to a particular website over the internet 270, a DNS query is submitted DNS services system 236 using the API 242. The storage unit 240 is examined in order to determine if a valid DNS record exists to resolve the DNS query. For example, certain parameters in the DNS query can be compared to various records stored within the storage unit 240. If a valid DNS record exists, it is immediately supplied to the application 234. If a valid record does not exist, the CPE 230 (or software operating therein) establishes a connection with the terminal 210 in order to submit the DNS query.

According to various embodiments, the DNS protocol unit 238 can apply DNSSEC protocols to digitally verify the DNS response. The terminal 210 can be configured to establish a communication link with the gateway 260 using the satellite network 250, and subsequently forward the DNS query to the gateway 260. Furthermore, the gateway DNS server 262 can be configured to examine records maintained in its storage unit and supply a matching record to the CPE 230. If a matching record is not available in the gateway DNS server 262, the DNS query can be submitted to an authoritative DNS server 280 via the external network 270. The authoritative DNS server 280 subsequently returns a matching DNS record (i.e., an authoritative record or authoritative DNS record) which can be supplied to the CPE 230. According to various embodiments, a copy of the authoritative record can be stored in the storage unit 240 of the CPE 230 and used to resolve DNS queries until its expiration.

As previously discussed, the DNS protocol unit 238 can be configured to implement domain name system security (DNSSEC) protocols to secure and authenticate information associated with DNS responses (i.e., records). Furthermore, the terminal 210 and gateway 260 can also be configured to implement DNSSEC protocols in order to detect, inspect, and/or forward DNS queries from CPEs 230 and DNS records supplied to the CPEs 230. DNS queries can therefore be submitted in unencrypted format, in accordance with DNSSEC protocols. Accordingly, the packet inspector 214 and DNS preload server 212 can examine parameters of DNS queries received from the CPE 230 and DNS records supplied from either the gateway DNS server 262 or the authoritative DNS server 280 without causing an authentication failure.

As previously discussed, the gateway 260 can support multiple terminals 210 that independently submit DNS queries. According to various embodiments, the gateway DNS server 262 can be configured to monitor and analyze DNS queries and authoritative records associated with all supported terminals 210. The analysis can be used to identify any patterns associated with individual terminals, between multiple terminals, etc. Depending on the specific implementation, such analysis can be performed over a predetermined time period, continuously, etc. For example, authoritative records supplied in response to DNS queries can be monitored and analyzed for a period of 1 hr., 2 hrs., 5 hrs., 10 hrs., 24 hrs., etc. Depending on the specific implementation, the analysis can be performed using machine learning techniques, statistical inference algorithms, etc. The results of such analysis can be supplied to the DNS preload server 212, in the form of DNS data, for use in generating the preload list.

Figure 3:
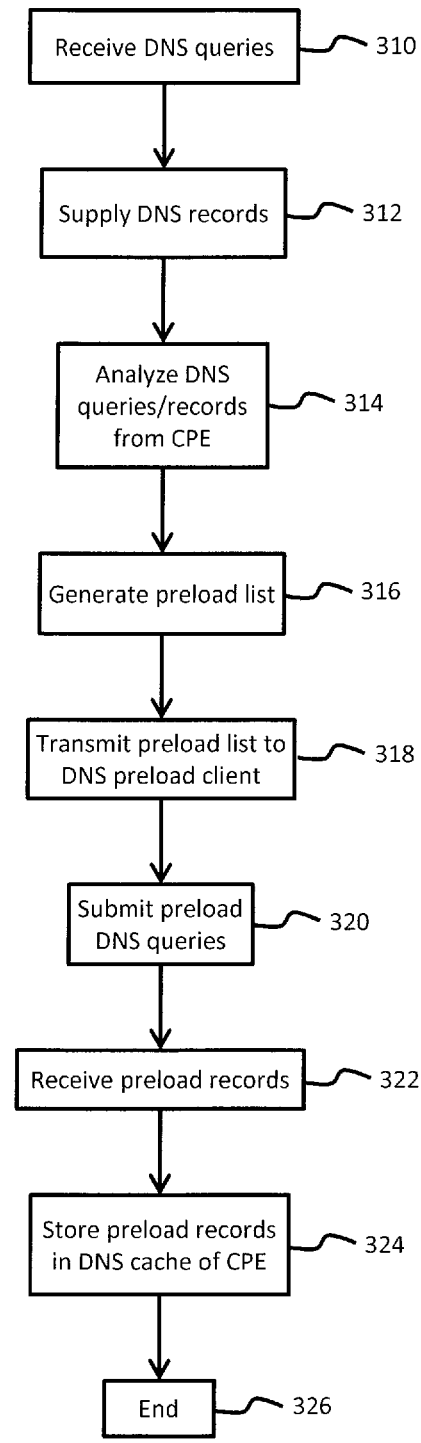
FIG. 3 is a flowchart of a process for improving DNS performance, according to one embodiment.

FIG. 3 illustrates a process for improving DNS performance, in accordance with an embodiment. At 310, a DNS query is received at the terminal. The DNS query can originate from various CPEs that are configured to establish communication links to external locations via the terminal. For example, an application running on the CPE may require access to a particular website. The application would submit the DNS query using a platform specific API for the CPE. The DNS query would subsequently be transmitted to the terminal. Depending on the specific implementation, the CPE would only submit the query to the terminal if a valid (e.g., unexpired) record is not available in the storage unit of the DNS services system.

At 312, a record satisfying the DNS query is supplied to the CPE. For example, the terminal may receive the record in response to subsequent communication with a gateway DNS server. The record is then supplied to the CPE by the terminal. Upon receiving the record, the CPE takes appropriate steps to supply the record to the application that initiated the original request. At 314, DNS queries and records associated with the CPE are analyzed. According to various embodiments, the terminal can be configured to examine the contents of DNS queries received from the CPE, as well as the contents of records being supplied to the CPE. Subsequent network traffic between the CPE and IP addresses contained in the records can also be examined as part of the analysis. The terminal may then generate statistical and/or predictive information concerning the behavior of various applications operating on the CPE.

At 316, the terminal generates a preload list based on some, or all, of the information gathered from analyzing the DNS queries and records. According to at least one embodiment, the preload list can include a list of domains (i.e., domain names) and a time schedule. The time schedule can include a specific time associated with each domain, or group of domains. Depending on the specific implementation, the preload lists can also include date associated with each domain. The time schedule specifies the precise time at which DNS queries should be submitted for the associated domains. At 318, the preload list is transmitted to the DNS preload client operating on the CPE.

At 320, the DNS preload client submits preload DNS queries (i.e., DNS queries or simply queries) based on information contained in the preload list. More particularly, the DNS preload client examines the entries contained in the preload list, and submits a DNS query for each domain at this specific time (and date) specified. If a particular time entry is associated with a group of domains, the DNS preload client submits DNS queries for all domains in the group at the specified time. The DNS queries are submitted by the DNS preload client using platform specific APIs and processed in the same manner as other DNS queries submitted by applications on the CPE.

At 322, preload records satisfying the preload DNS queries submitted by the DNS preload client are received by the CPE. At 324, the DNS services system of the CPE stores a copy of the preload records within its associated storage unit based, in part, on the value specified in the TTL parameter of the preload record. The DNS services system also forwards a copy of the preload record to the DNS preload client. Once the preload records have been stored, applications that submit DNS queries for domains included in the preload list can immediately receive a copy of the preload record matching the DNS query, without CPE having to submit the DNS query to the terminal. The process ends at 326.

Figure 4:
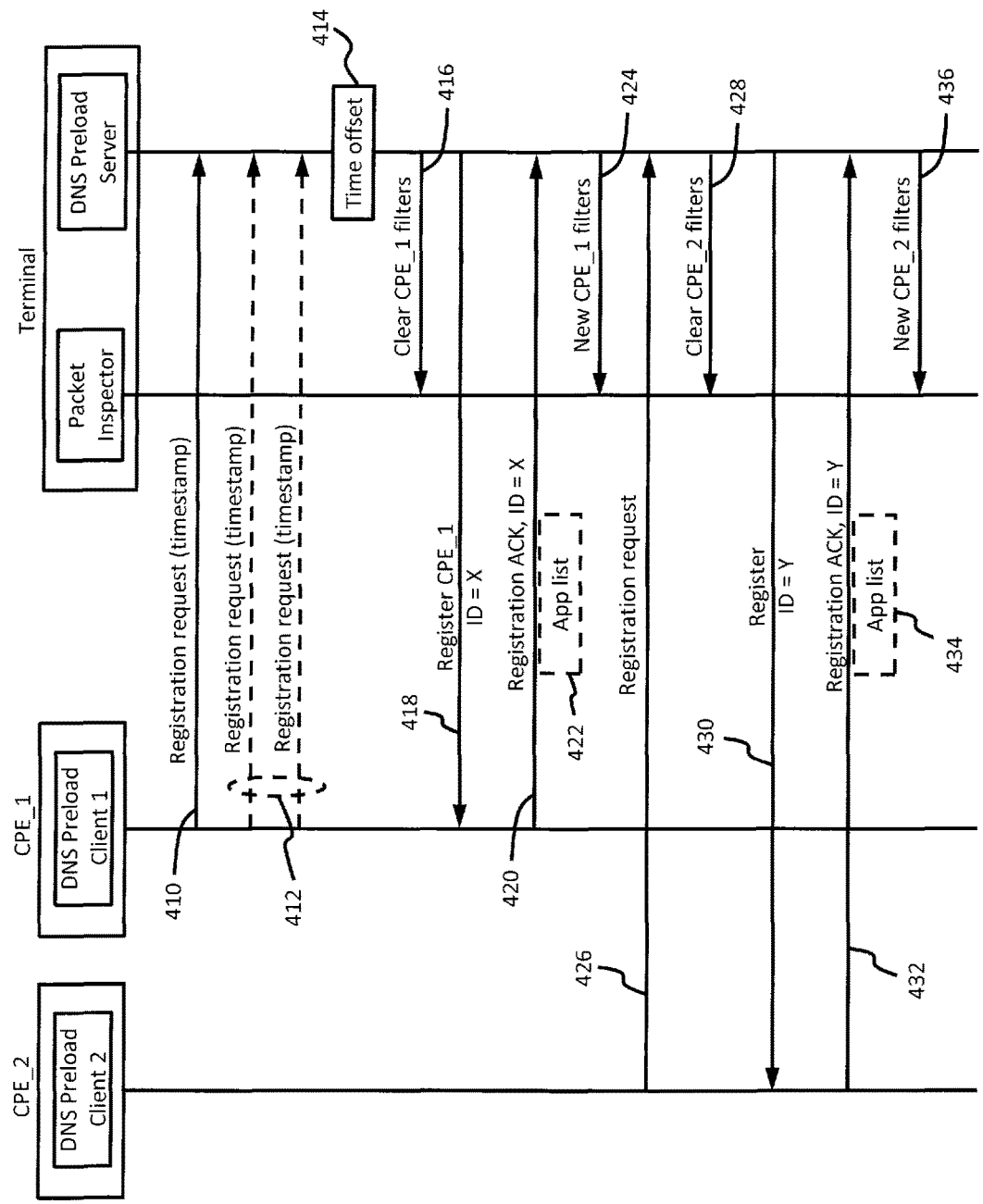
FIG. 4 is a ladder diagram illustrating registration of DNS preload clients, according to one embodiment.

FIG. 4 illustrates registration of DNS preload clients, according to one or more embodiments. At 410, a registration request is submitted from the preload client of a CPE (i.e., CPE_1) to the DNS preload server located within the terminal. According to one or more embodiments, the registration request can be in the form of a UDP message containing a timestamp which identifies the time at which the request was transmitted by the DNS preload client. The timestamp can be used by the DNS preload server to determine a time offset between the terminal and the CPE. Furthermore, the timestamp can be used compensate the time schedule contained in the preload list. Depending on the specific implementation, the DNS preload client can be supplied with the IP address and port for establishing a connection with DNS preload server during its initial installation on the CPE. Other mechanisms, such as multicast DNS, can also be used to detect the availability of the DNS preload server. In situations where the CPE does not include a DNS preload client and/or the terminal does not include a DNS preload server, functionality of the CPE or associated DNS operations are not adversely affected.

According to various embodiments, the registration request can be repeatedly submitted to the DNS preload server until an acknowledgment is received. This is illustrated at 412. At 414, the DNS preload server generates a time offset based, in part, on the timestamp. The time offset can correspond, for example, to the precise amount of time it takes for messages from the CPE to reach the terminal. According to various embodiments, the time offset can be used to more accurately predict the times provided in the preload list. At 416, the DNS preload server supplies an instruction to the packet inspector to clear all filters associated with the CPE. Thus, all parameters that were previously used to collect information pertaining to the CPE would be cleared. A new context is also created for the CPE to facilitate tracking thereof by the DNS preload server.

At 418, the DNS preload server supplies registration information to the DNS preload client. According to the embodiment illustrated in FIG. 4, the DNS preload server registers the CPE and provides a unique identification (e.g., ID=X) and port number to be used in all subsequent communication between the DNS preload client and the DNS preload server. Depending on the specific implementation, the registration information can include additional data to be used by the DNS preload client. At 420, the DNS preload client transmits an acknowledgment to the DNS preload server to indicate that the registration information has been successfully received. The registration acknowledgment also includes the unique ID which was assigned to the DNS preload client.

According to at least one embodiment, the DNS preload client may include an application list with the registration acknowledgment, as indicated at 422. For example, the DNS preload client can be configured to probe the CPE to identify all installed applications and incorporate those applications within the application list. According to various embodiments, the DNS preload client can also collect information pertaining to the frequency with which applications are used, and only supply an application list containing applications that are used with a minimum frequency by the customer. At 424, the DNS preload server creates new filters to be used for the CPE. The DNS preload server also instructs the packet inspector to forward copies of packets with the destination IP address of the CPE and source port 53, which corresponds to DNS responses (or records) for requests originating from the CPE.

As previously discussed, the terminal is capable of supporting multiple CPEs. Depending on the specific type of CPE or device configuration, a DNS preload client may or may not be present. Any additional DNS preload clients present on CPEs supported by the terminal, can also be registered with the DNS preload server. For example, the DNS preload client on CPE_2 (i.e., DNS preload client 2) can submit a registration request at 426. Upon receiving the request, the DNS preload server instructs the packet inspector to clear, or reset, all filters associated with CPE_2. At 430, the DNS preload server supplies registration information to DNS preload client 2. As previously discussed, the DNS preload server generates a unique identification for each DNS preload client. Thus, DNS preload client 2 receives identification ID=Y.

At 432, DNS preload client 2 submits a registration acknowledgment to the DNS preload server in order to confirm successful receipt of the registration information. DNS preload client 2 also utilizes the assigned ID to distinguish itself from other DNS preload clients registered with the DNS preload server. Depending on the particular configuration of DNS preload client 2, an application list 434 can also be included with the registration acknowledgment. It should be noted, however, that certain DNS preload clients may not be configured to probe the CPE, or may be prevented from examining the contents of data stored within the CPE. In such cases, an application list would not be included with the registration acknowledgment. At 436, the DNS preload server generates new (or revised) filters to be used by the packet inspector for DNS preload client 2. The DNS preload server also instructs the packet inspector to forward copies of packets with the destination IP address of CPE_2 and source port 53. Additional DNS preload clients would be registered in the same manner upon establishing a wired or wireless network connection with the terminal.

During normal activities, it is possible that the IP address assigned the CPE may change. This can occur, for example, when the CPE transitions from terrestrial wireless to Wi-Fi, or when the Dynamic Host Configuration Protocol (DCHP) lease assigned by the terminal (or external router) expires. The DNS preload server should be informed of any changes to the IP address so that the packet inspection filters can be updated to track the DNS and/or other network activity of the CPE. According to an embodiment, the DNS preload client can be configured to transmit periodic "health report" messages to the DNS preload server. The contents of packets associated with the health report can be examined by the DNS preload server in order to detect IP address changes and update the filters accordingly. In addition to the periodic health report messages, the DNS preload client can be configured to send an asynchronous message upon detecting changes to the IP address of the CPE.

Figure 5:
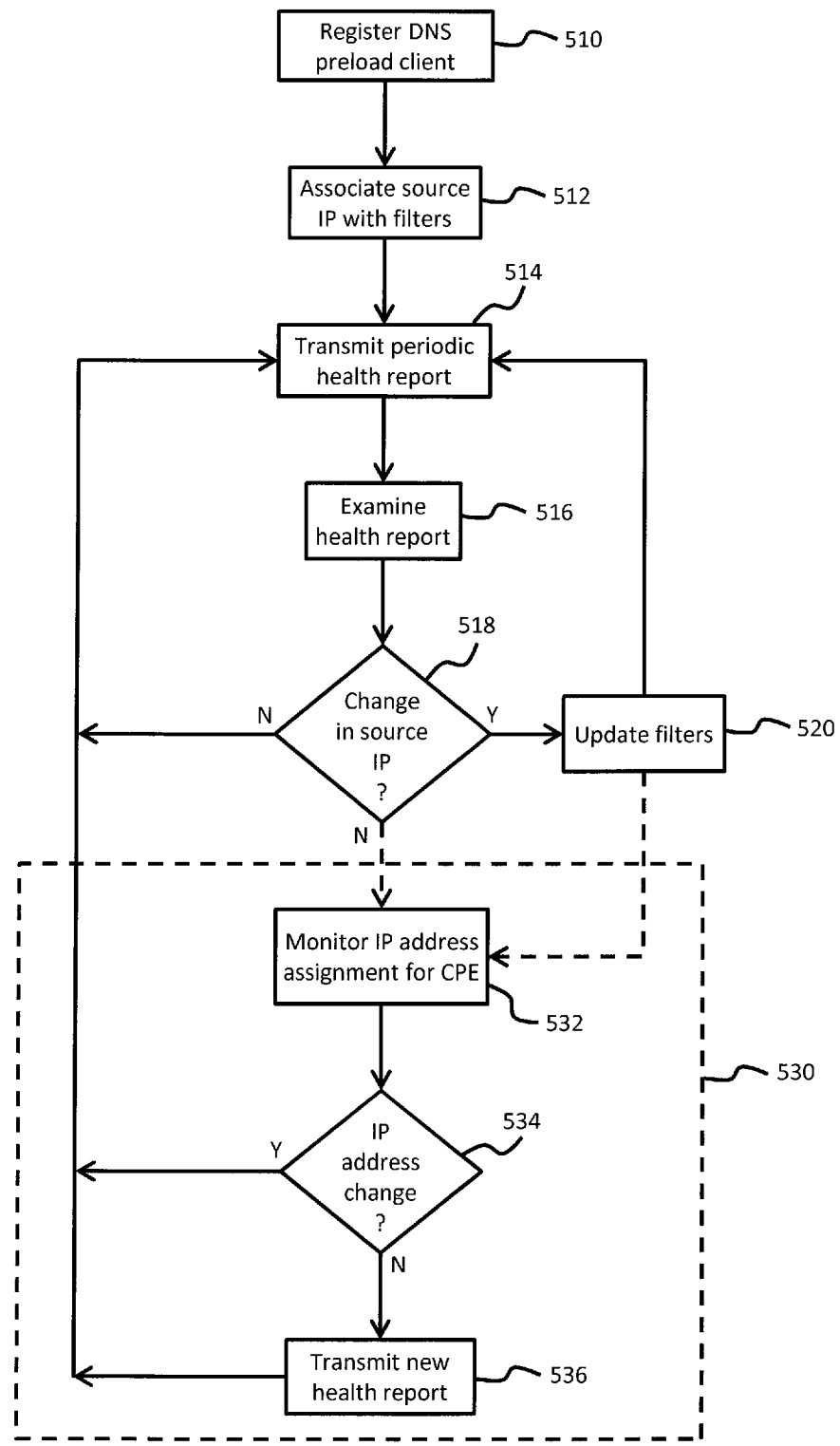
FIG. 5 is a flowchart of a process for detecting changes in the IP address associated with a DNS preload client, according to one or more embodiments.

FIG. 5 illustrates a process for determining changes in the IP address of a CPE in accordance with one or more embodiments. At 510, the DNS preload client is registered with the DNS preload server. This can be accomplished, for example, using the process previously described with respect to FIG. 4. At 512, a source IP address is associated with the filters generated for the DNS preload client. According to various embodiments, the source IP address can correspond to the IP address assigned to the CPE by the terminal. At 514, a health report is transmitted to the DNS preload server from the DNS preload client. According to the disclosed embodiments, the health report can be periodically transmitted to the DNS preload server at predetermined time intervals (1, 15, 30, 60, 120 minutes, etc.). The time interval can be selected based on the specific system requirements. Factors that may be considered in selecting the time interval can include, without limitation, overall CPE traffic, individual application traffic, number DNS queries submitted, etc.

At 516, the health report is examined by the DNS preload server. At 518, the DNS preload server determines whether any changes have occurred in the source IP address associated with the health report. A change in the source IP address can occur, for example, if the CPE is disconnected from the terminal for an extended period of time, or when the lease associated with the source IP address has expired. As previously discussed, the DNS preload server assigns a unique ID to each DNS preload client. This ID is included in all communication between the DNS preload client (via the CPE) and the DNS preload server. Accordingly, if the source IP address of the CPE changes, the DNS preload server will still be able to correctly identify the DNS preload client using this ID. If a change in the source IP address has occurred, the DNS preload server updates the filters associated with the CPE at 520. The updated filters can then be provided to the packet inspector so that network traffic to/from the CPE can be continually monitored. Control then returns to 514 where periodic health reports continue to be transmitted to the DNS preload server. If there are no changes in the source IP address associated with the health report, control also returns to 514.

According to various embodiments, for example, the DNS preload client can be configured to detect any changes in the IP address assigned to the CPE. Such embodiments provide an optional capability to monitor changes in the IP address of the CPE, as indicated at 530. Depending on the specific CPE, however, such information may not be accessible to the DNS preload client. According to such embodiments, control would optionally pass to 532 after the DNS preload server updates the filters at 520. Furthermore, if DNS preload server does not detect a change in the source IP address of the health report (at 518), control optionally passes to 532 as well. Next, at 532, the DNS preload client monitors any changes in the IP address assigned to the CPE. At 534, the DNS preload client determines whether or not a change has occurred in the source IP address of the CPE. If a change has occurred, the DNS preload client immediately transmits a new health report to the DNS preload server at 536. If no changes are detected, control returns to 514 where periodic health reports continued to be transmitted to the DNS preload server.

Figure 6:
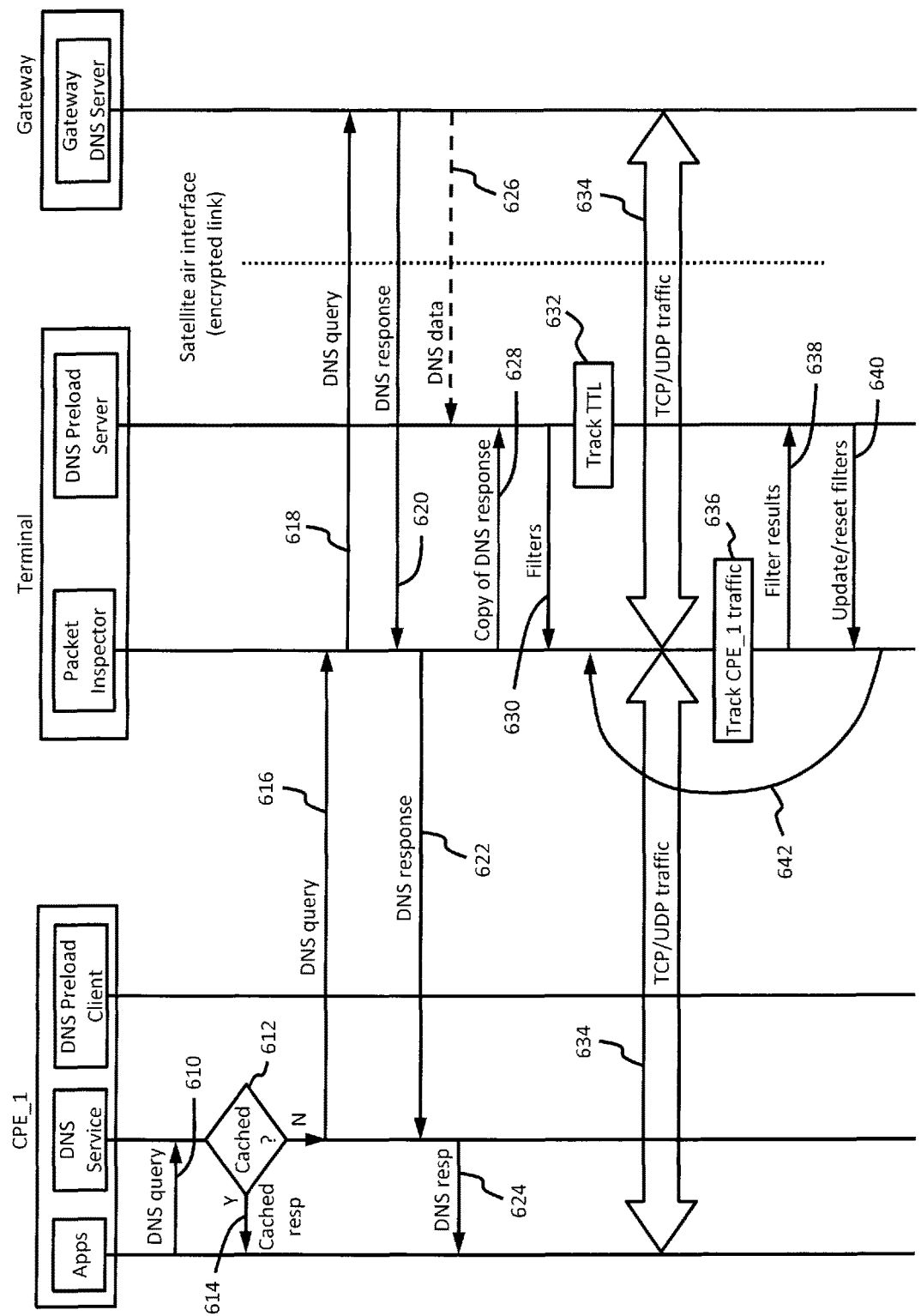
FIG. 6 is a ladder diagram illustrating DNS activity tracking, according to various embodiments.

FIG. 6 illustrates network activity tracking according to various embodiments. At 610, a DNS query is submitted by an application running on the CPE. According to the illustrated embodiment, DNS queries (i.e., name resolution requests) from applications on the CPE are handled by the DNS services system. Accordingly, the exact API used by the applications will depend on the operating system and application frameworks. In most cases, the applications are built using frameworks that provide high level abstraction for submitting/receiving DNS queries/records. The result of DNS queries can be delivered synchronously or asynchronously via framework call backs.

At 612, the DNS services system determines if the storage unit contains a valid record capable of satisfying the DNS query. If a record is found within the storage unit of the DNS services system, it is immediately supplied to the application at 614. If a record is not available within the storage unit, the DNS query is submitted to the terminal at 616. More particularly, if no cached results are found for the requested domain (i.e., the DNS query), the DNS services system initiates a lookup using standard DNS protocol procedures. The DNS query is then sent to the DNS preload server at the terminal. The packet inspector examines the contents of the DNS query and tracks any information associated with the filters created for the CPE.

The DNS query is then submitted to the gateway DNS server at 618. More particularly, the terminal establishes a communication link to the gateway over the satellite network. As previously discussed, all communication carried over the satellite network can be encrypted using layer-2 or layer-3 encryption techniques for security. Upon receiving the DNS query, the gateway DNS server searches its storage unit to locate a matching record for the DNS query. Once the record is located, it is supplied to the terminal over the satellite link at 620. Although not illustrated in FIG. 6, there may be situations where a matching record is not available at the gateway DNS server. According to various embodiments, the gateway can be configured to further submit the DNS query to an authoritative DNS server in order to obtain a matching authoritative record. Furthermore, the gateway DNS server can be configured to store a copy of the authoritative record within its storage unit in order to resolve any subsequent DNS queries that are received during the life of the record. Once the record is supplied to the terminal, the packet inspector examines its contents based on the filters corresponding to the CPE. At 622, the record is supplied to the DNS services system of the CPE, where a copy of the record is cached in the storage unit. The precise duration for which the record is cached is determined, in part, by the TTL information contained in the record. At 624, the DNS services system supplies the record to the application which initiated the DNS query.

As previously discussed, the gateway supports simultaneous connections to multiple terminals. According to one or more embodiments, the gateway can be configured to collect and analyze data pertaining to DNS queries and records associated with each terminal. Some or all of the analyzed data can optionally be transmitted to the DNS preload server at 626. The DNS preload server can further analyze the data received from the gateway in order to refine the information contained in the preload list.

At 628, the packet inspector submits a copy of the record to the DNS preload server. According to various embodiments, the DNS preload server can be configured to decode the record received from the gateway to extract and store the name to IP address mappings in the context maintained for the CPE. The DNS preload server can also extract the TTL parameter from the record and store the value in the context maintained for the CPE. At 630, the DNS preload server creates new filters for the CPE and supplies the filters to the packet inspector. For example, the filters can direct the packet inspector to track packets with source or destination IP addresses matching the list of IP addresses extracted from the record received from the gateway. At 632, the DNS preload server tracks the expiration of the record using, in part, the TTL parameter contained therein. According to various embodiments, the DNS preload server can be configured to calculate the expiration time by adjusting the value of the TTL parameter in order to compensate for factors such as transmission delay from the gateway, time offset from the CPE, etc. The expiration time can subsequently be stored in the context maintained for the CPE. According to various embodiments, if the DNS query and record are transmitted without encryption, the DNS preload server can be configured to implement various secure DNS proxy functions. Such features can advantageously allow the DNS preload server to replace the value of the TTL parameter in the record with an adjusted value after applying the compensation factors.

At 634, the application which submitted the DNS query generates traffic to and from addresses contained in the record received at 624. The traffic is carried to the gateway and subsequently to external networks, such as the internet. The traffic is carried in the form of packets (TCP or UDP) having a source/destination IP address matching the IP address of the domain name for which the DNS query was originally submitted at 610. As illustrated in FIG. 6, the packet inspector tracks all of the traffic associated with the CPE at 636. According to an embodiment, the traffic may be identified based, in part, on source and destination IP addresses contained in the filters. Furthermore, as packets are examined by the packet inspector, statistics are updated for all packets that match the filter criteria specified by the DNS preload server. The packet count statistics and the time stamp corresponding to the most recent activity are maintained by the packet inspector until requested to be cleared.

At 638, the results of information collected using the filters are submitted to the DNS preload server. According to various embodiments, the filter results can be submitted to the DNS preload server at predetermined time intervals, or when certain thresholds have been met. For example, once a certain amount of traffic has occurred from the CPE, the results can be supplied to the DNS preload server. Alternatively, the DNS preload server may periodically request the information from the packet inspector. At 640, the DNS preload server analyzes the information received from the packet inspector and either updates or resets the filters. The updated or reset filters are then supplied to the packet inspector. The packet inspector then continues to monitor network traffic from the CPE as indicated by 642. According to various embodiments, this process can continue until the DNS preload server determines that the CPE no longer requires tracking, or the CPE is disconnected from the network (switches to cellular data, public Wi-Fi, etc.). The information collected by the packet inspector is analyzed at periodic intervals to determine the list of domains that are most likely to be requested by applications running on the CPE. While all DNS activity is tracked, only those interactions that show recurring patterns and actual traffic exchanges are considered for inclusion in the preload list. Furthermore, the preload list can contain entries based on DNS data supplied by the gateway.

Figure 7:
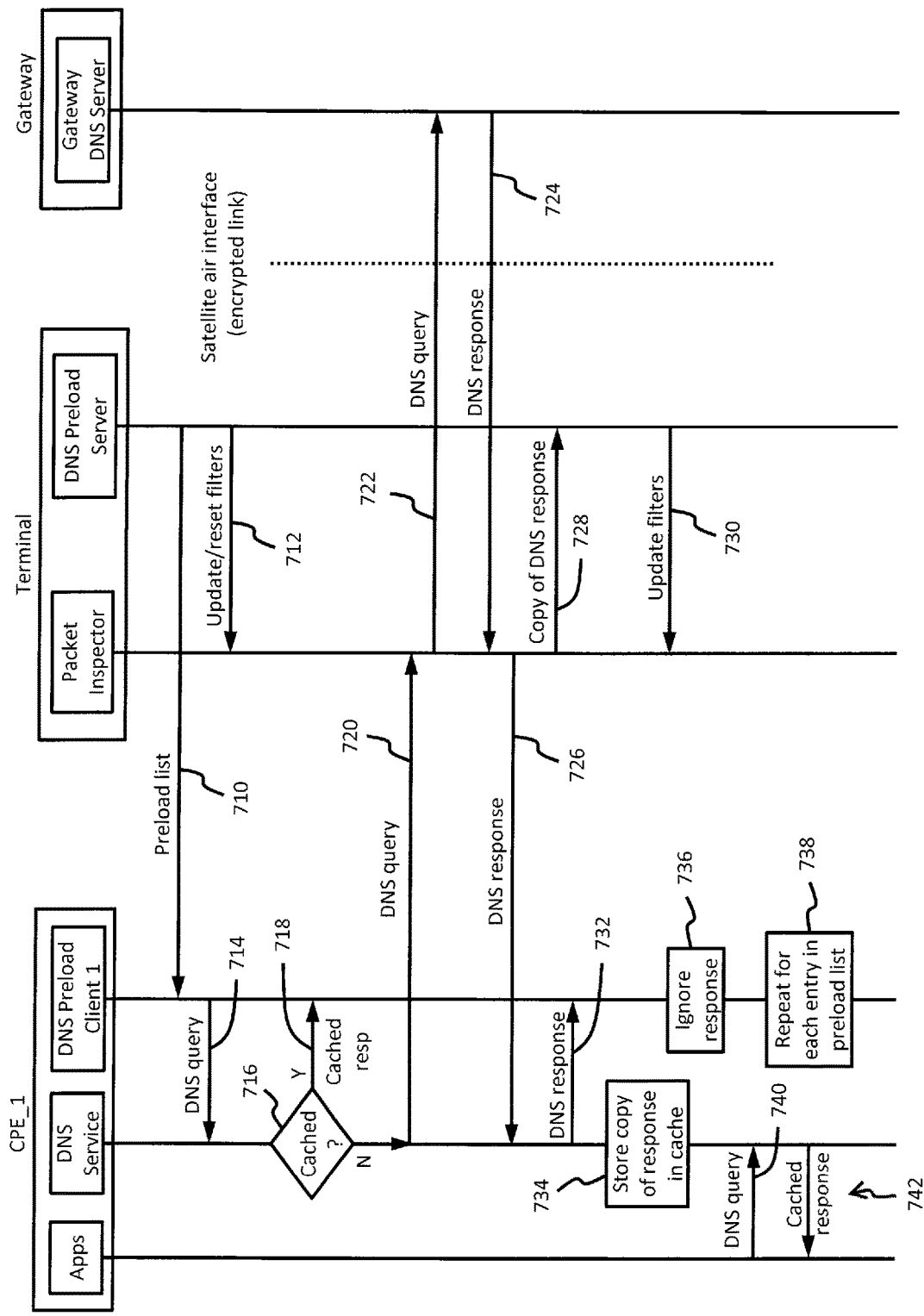
FIG. 7 is a ladder diagram illustrating DNS cache refresh, according to one or more embodiments.

FIG. 7 illustrates a process for cache refresh according to one or more embodiments. At 710, the preload list is generated by the DNS preload server and transmitted to the DNS preload client. As previously discussed, the preload list contains a list of domains and a time schedule at which the DNS preload client should submit DNS queries for those domains. The preload list can be created, for example, based on analysis of traffic from applications in the CPE. Furthermore, the time schedule contained in the preload list is created to predict when applications on the CPE will submit DNS queries for those domains, so that matching records may be available from the DNS services system of the CPE. According to various embodiments, the information collected by the packet inspector is analyzed at periodic intervals to determine the list of domains that are most likely to be requested by applications running on the CPE. While all DNS activity is tracked, only those interactions that show recurring patterns and with actual traffic exchanges are considered for inclusion in the preload list. Furthermore, the preload list can contain entries based on DNS data supplied by the gateway. The preload list is subsequently parsed and stored by the DNS preload client. The newly received preload list also replaces previous lists, if any, that were in use by the DNS preload client.

At 712, filters associated with the CPE are updated or reset, and supplied to the packet inspector. This ensures that stale or unused DNS queries are not utilized for generating the preload list. At 714, the DNS preload client submits a preload DNS query (or simply DNS query) corresponding to the first entry (i.e., domains and time schedule) contained in the preload list. As previously discussed, such DNS queries are submitted in the same manner as all other applications currently running on the CPE, namely through the use of platform specific APIs. Thus, the preload DNS query (or DNS query) is received and processed by the DNS services system. At 716, the DNS services system searches the storage unit in order to determine whether or not a matching record exists for the preload DNS query. If a matching record is found, it is supplied to the DNS preload client at 718.

According to the disclosed embodiments, however, a matching record should not be available within the DNS services system of the CPE. As previously discussed, the DNS preload server tracks and analyzes network traffic for the CPE, and is aware of the status of all records that may be stored within the storage unit of the DNS services system. Thus, all entries contained in the preload list will correspond to records that either do not exist, or will expire prior to the time specified in the preload list. If a matching record is not found in the storage unit, the preload DNS query is submitted to the terminal at 720. The packet inspector examines the contents of the preload DNS query (or DNS query) based on information contained in the filters. At 722, the DNS query is submitted to the gateway DNS server via the satellite link.

At 724, a matching record is received from the gateway DNS server. The packet inspector again examines the contents of the record based on the current filters. At 726, the record is supplied to the DNS services system of the CPE. A copy of the matching record is supplied to the DNS preload sever at 728. The DNS preload server extracts information such as name to IP address mappings at 728. The DNS preload server updates or creates new filters for the packet inspector at 730. The filters can subsequently be utilized to track network activity of the CPE.

At 732, the DNS services system supplies the record to the DNS preload client in the same manner in which records are supplied to other applications. Additionally, the DNS services system stores a copy of the record within its storage unit at 734. Thus, the DNS services system of the CPE now contains a valid record matching the DNS query from the preload list. According to the disclosed embodiments, records received by the DNS preload client are ignored, and not utilized to generate subsequent network traffic. The primary purpose of the preload list is to obtain valid records that can be stored within the DNS services system of the CPE prior to being used by other applications.

At 738, the DNS preload client continues to submit DNS queries for each entry contained in the preload list. Thus, the process from 714 to 736 would be repeated for each entry. At 740, a DNS query is received from an application running in the CPE. The DNS services system examines its storage unit and determines that this DNS query can be matched with a record stored as a result of the DNS query previously received from the DNS preload client. Accordingly, at 742, the DNS services system immediately supplies the matching record to the application without the need to submit a new DNS query to the terminal.

Figure 8A:
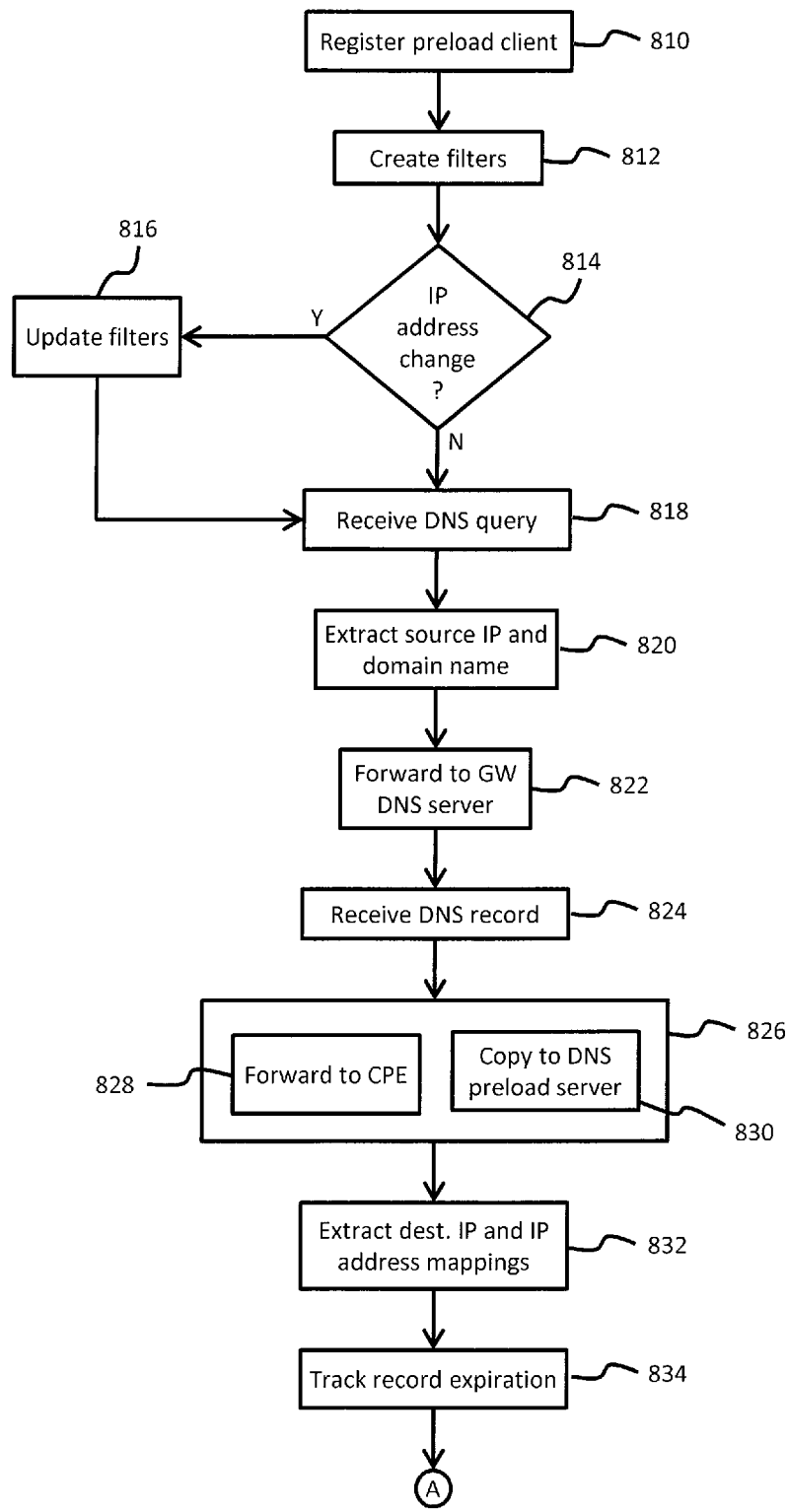
FIGS. 8A and 8B are a flowchart of a process for improving DNS performance using DNS preload client, according to various embodiments.
Figure 8B:
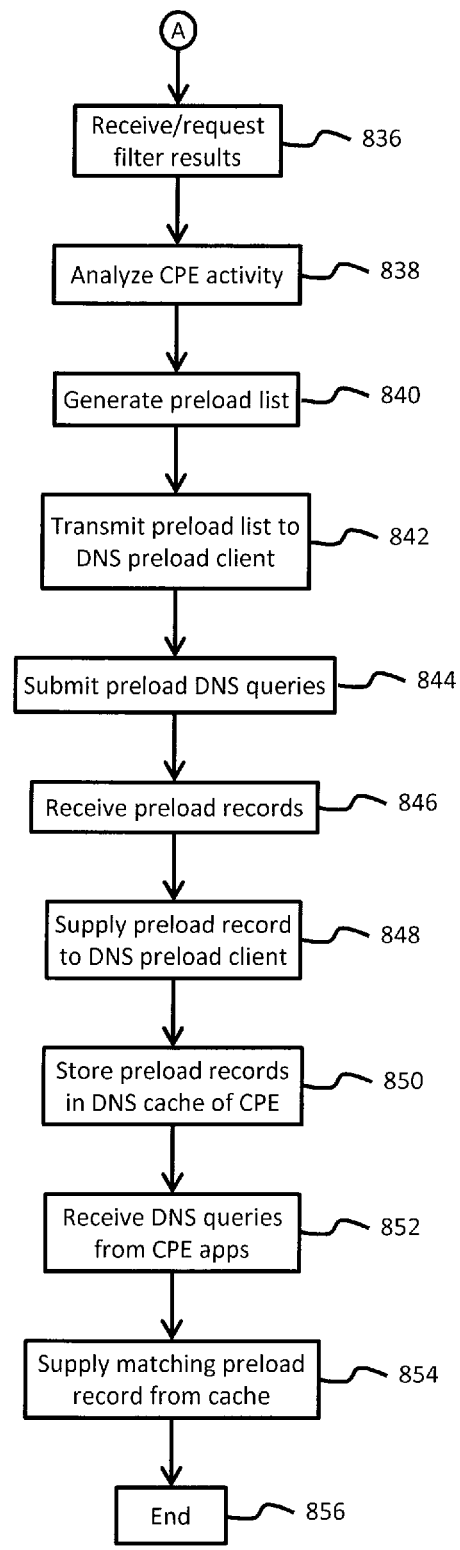

FIGS. 8A and 8B illustrate a process for improving DNS performance using DNS preload client, in accordance with various embodiments. At 810, the DNS preload client initiates the registration process with the DNS preload server. As previously discussed, the DNS preload server generates a unique identification that is assigned to each DNS preload client associated with the terminal. While the terminal may support various types of CPEs, only some of the CPEs may be configured to incorporate a DNS preload client. For example, devices such as Internet of things, security cameras, etc., may not be configured to allow installation and operation of a DNS preload client. At 812, the DNS preload server creates the filters associated with the particular DNS preload client that has been registered. The filters are supplied to the packet inspector in order to detect and monitor network traffic associated with the CPE containing the DNS preload client.

At 814, changes in the IP address of the CPE are monitored. As previously discussed, changes in the IP address of the CPE can be detected based by the DNS preload server during examination of health reports received from the DNS preload client. Alternatively, the DNS preload client can be configured to detect any internal changes and the IP address of the CPE and immediately supply a health report so that the DNS preload server may detect the change in IP address. If an IP address change is detected, the DNS preload server updates the filters associated with the DNS preload client at 816. For example, the DNS preload server can modify the filters to reflect the current IP address of the CPE. The packet inspector would then discontinue monitoring network traffic associated with the old (or expired) IP address of the and begin tracking the network traffic associated with the new IP address contained in the updated filters. According to various embodiments, the IP address of the CPE is continually monitored in order to detect changes so that the filters can be appropriately updated.

If no changes are detected in the IP address of the CPE, control passes to 818, where a DNS query is received at the terminal. At 820, the packet inspector extracts the source IP address and domain name contained in the DNS query in order to determine if the DNS query originates from the terminal containing the registered DNS preload client. For example, if the DNS query originates from the CPE of the registered DNS preload client, this information would constitute part of the network traffic being monitored. If the DNS query originates from a CPE without a DNS preload client, for example, the source IP address would not match information from the filters and the network traffic from this CPE would not be monitored. At 822, the DNS query is forwarded to the gateway DNS server using the satellite network. As previously discussed, all information transmitted over the satellite network can be encrypted using layer-2 or layer-3 encryption techniques in order to provide secure communication.

At 824, a matching record is received at the terminal. According to various embodiments, the gateway DNS server would search its storage unit (or cache) in order to retrieve a valid record which matches the DNS query. If a valid record is not available, the gateway DNS server can be further configured to submit the DNS query to an authoritative DNS server via the internet. Accordingly, the matching record received at the terminal can be obtained directly from the gateway DNS server or indirectly from the authoritative DNS server. At 826, the packet inspector examines the record, and transmits copies to the appropriate destinations. More particularly, at 828, a copy is sent to the CPE from which the DNS query originated. If the record is associated with the previously registered DNS preload client, however, a copy is also sent to the DNS preload server at 830.

At 832, the DNS preload server extracts the destination IP address and address mappings contained in the record. At 834, the DNS preload server begins tracking the expiration time for the record. According to at least one embodiment, the DNS preload server can examine the record to obtain the value contained in the TTL parameter. This value can optionally be modified to compensate for various factors including, but not limited to, transmission delays associated with record. The DNS preload server can subsequently generate a timer which calculates, or counts down to, the time at which the record will expire. At 836, statistics associated with network traffic from the CPE are received at the DNS preload server. According various embodiments, the packet inspector can be configured to automatically supply the network traffic statistics resulting from the filters to the DNS preload server at predetermined or periodic intervals. The DNS preload server can also initiate a request for network traffic statistics.

At 838, the DNS preload server performs an analysis of the network activity from the CPE. According to the disclosed embodiments, the network activity associated with the CPE can include all requests for name resolution (i.e., DNS requests), as well as subsequent traffic to and from address mappings contained in the matching record. This analysis is used to predict when apps from the CPE may submit DNS queries that require resolution by the gateway DNS server. At 840, the DNS preload server generates a preload list. The preload list contains, for example, various domains and a time schedule at which those domains should be accessed. According to various embodiments, the time schedule is created such that DNS queries pertaining to domains in the preload list are submitted prior to predicted access by applications in the CPE. This schedule is determined, at least in part, on the analysis of network activity for the CPE. At 842, the preload list is transmitted to the DNS preload client. At 844, the DNS preload client submits DNS queries (i.e., preload DNS queries) for domains contained in the preload list. The DNS queries are submitted at the times specified in the schedule.

According to various embodiments, the DNS preload server is aware of the records that have been supplied to the CPE as well as the TTL parameters contained in these records. The DNS preload server can therefore use this information to track the expiration time of records stored by the CPE. Accordingly, the time schedule is generated such that all preload DNS queries are submitted at a time when records from the DNS services system of the DNS preload client device are either nonexistent or expired. The preload DNS queries are therefore submitted to the terminal for resolution by the gateway DNS server. At 846, a matching record (or preload record) is received from the gateway DNS server. At 848, the preload record is supplied to the DNS preload client. More particularly, the preload record is supplied to the CPE, and the DNS services system supplies the record to the DNS preload client. The preload record corresponds to a matching record for the preload DNS query submitted by the DNS preload client. At 850, a copy of the preload record is saved in the storage unit of the DNS services system.

According to the disclosed embodiments, the DNS preload client does not initiate additional network traffic based on the received preload records. Rather, the preload queries are initiated only to insure that valid records are available in the DNS services system at times when applications installed on the CPE are predicted to request resolution for the same domains. At 852, the DNS services system of the CPE receives one or more DNS queries from applications installed on the CPE. The DNS services system subsequently searches the storage unit and supplies the matching record directly to the application without submitting the DNS query to the terminal. More particularly, since the DNS preload server performs an analysis to predict IP addresses likely to be requested at specific times from applications installed on the CPE, the preload records stored within the storage unit correspond to valid records that can be used to resolve such DNS queries at the time submitted by the applications. The process ends at 856.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. For example, such hardware/software/firmware combinations can be incorporated into the previously described terminal, DNS preload server, packet inspector, satellite network transport, configuration handler, CPE, DNS preload client, DNS services system, DNS protocol unit, network manager, gateway, gateway DNS server, transmitters, transceivers, etc. Additionally, such hardware can be interfaced to connect and/or facilitate communication between different components such as the terminal and CPEs, the configuration handler and satellite network transport unit, the DNS protocol unit and storage unit, the network manager and the gateway DNS server, etc.

Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 9:
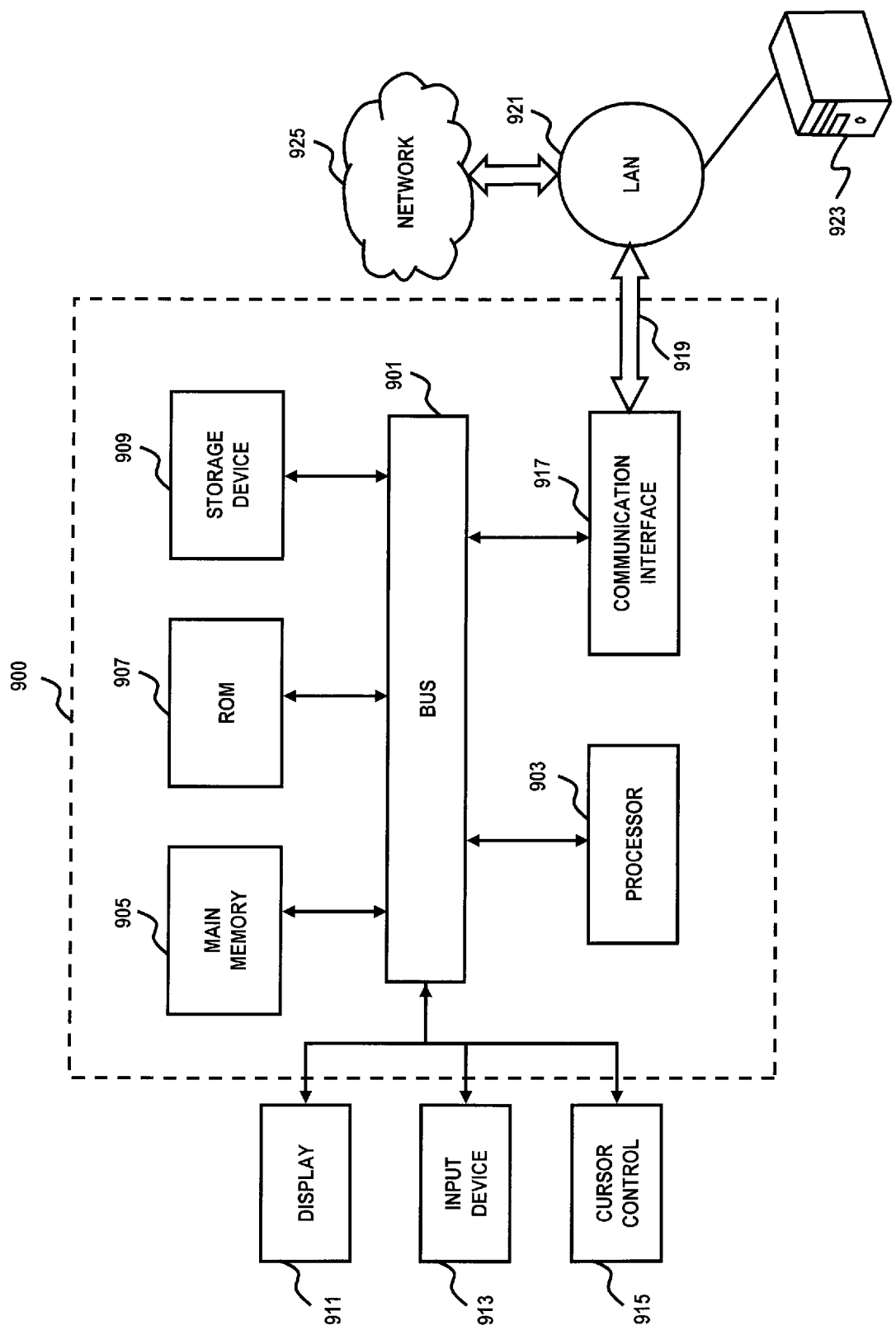
FIG. 9 is a diagram of a computer system that can be used to implement various exemplary features and embodiments.

FIG. 9 is a diagram of a computer system that can be used to implement features of various embodiments. The computer system 900 includes a bus 901 or other communication mechanism for communicating information and a processor 903 coupled to the bus 901 for processing information. The computer system 900 also includes main memory 905, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a light emitting diode (LED) or other flat panel displays, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911. Additionally, the display 911 can be touch enabled (i.e., capacitive or resistive) in order facilitate user input via touch or gestures.

According to an exemplary embodiment, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multiprocessing arrangement may also be employed to execute the instructions contained in main memory 905. In alternative embodiments, hard-wired circuitry may be used in place of or in combination with software instructions to implement exemplary embodiments. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a High Definition Multimedia Interface (HDMI), etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 such as a wide area network (WAN) or the Internet. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Non-volatile media can further include flash drives, USB drives, microSD cards, etc. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 10:
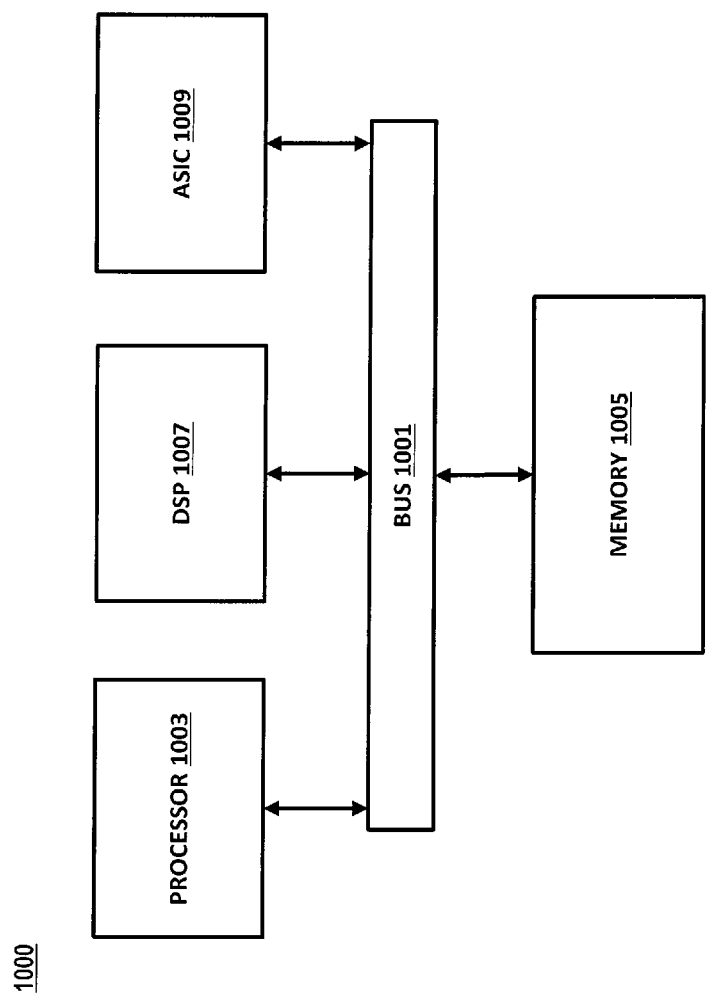
FIG. 10 is a diagram of a chip set that can be used to implement various exemplary features and embodiments.

FIG. 10 illustrates a chip set 1000 upon which features of various embodiments may be implemented. Chip set 1000 is programmed to implement various features as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1000, or a portion thereof, constitutes a means for performing one or more steps of the figures.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 1005 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:
1. A method comprising:
   receiving, by a terminal of a wireless communications network, one or more DNS queries from a customer premise equipment (CPE);
   receiving respective DNS records corresponding to the one or more DNS queries and providing the records to the CPE in response to the one or more DNS queries;
   analyzing one or more of the DNS queries received from the CPE, the DNS records supplied to the CPE, and network activity of the CPE;

generating a preload list based on the analysis and providing the preload list to the CPE, wherein the preload list includes a list of domains and a time schedule which specifies a particular time for each domain at which the CPE is to provide a DNS preload query to the terminal for the respective domain;

receiving, by the terminal, one or more preload DNS queries from the CPE for one or more of the domains listed in the preload list based on the particular times specified in the time schedule for the respective one or more domains; and providing, by the terminal, preload records to the CPE in response to the one or more preload DNS queries for storage within a DNS cache of the CPE, and for resolving DNS queries of applications of the CPE.

2. The method of claim 1, further comprising:
receiving, by the terminal, a registration request from the CPE;
creating a context containing a unique client ID for the CPE; and
providing a registration acknowledgement containing the client ID to the CPE.

3. The method of claim 1, further comprising:
monitoring the network activity of the CPE; and
detecting a new IP address assignment for the CPE,
wherein the step of analyzing the network activity of the CPE includes analyzing the network activity of the CPE using the new IP address.

4. The method of claim 1, further comprising receiving a health report from the CPE at predetermined intervals, wherein the health report indicates, in part, a status of the CPE.

5. The method of claim 4, wherein the health report includes identification of one or more of installed applications and active applications of the CPE.

6. The method of claim 1, wherein the receiving of the DNS queries by the terminal comprises:
examining contents of each DNS query;
identifying a source IP address and domain name contained in the DNS query; and
forwarding the DNS query to a DNS server via a wireless network interface of the terminal.

7. The method of claim 1, wherein the receiving of DNS records associated with the one or more DNS queries comprises examining contents of each DNS record and identifying a destination IP address and domain name to IP address mappings contained in the DNS record.

8. The method of claim 1, wherein the receiving of DNS records associated with the one or more DNS queries comprises providing a copy of each received DNS record to a DNS preload server of the terminal.

9. The method of claim 1, wherein the analyzing step further comprises:
generating one or more of statistical data and predictive data regarding DNS usage and time for the CPE; and
tracking an expiration time for each DNS record based, at least in part, on a time to live parameter in the DNS record.

10. The method of claim 1, further comprising deriving correlations between domains and time accessed by the CPE, wherein the generation of the preload list is further based on the derived correlations.

11. The method of claim 1, further comprising examining a timestamp parameter contained in messages received from the CPE and determining a time offset between the CPE and the terminal based, in part, on the timestamp parameter, wherein the generation of the preload list is further based on the time offset.

12. The method of claim 1, wherein the preload list further includes entries based on data received from a gateway of the wireless communications network.

13. A terminal of a wireless communications network, comprising:
a client interface configured to communicate with a customer premise equipment (CPE);
a wireless network interface configured to communicate with remote devices over wireless links of the communications network;
one or more processors configured to receive DNS queries from the CPE, to receive respective DNS records corresponding to the one or more DNS queries, and to provide the records to the CPE in response to the DNS queries; and
wherein the one or more processors are further configured to perform an analysis of one or more of the DNS queries received from the CPE, the DNS records supplied to the CPE, and network activity of the CPE,
wherein the one or more processors are further configured to generate a preload list based on the analysis and to provide the preload list to the CPE, wherein the preload list includes a list of domains and a time schedule which specifies a particular time for each domain at which the CPE is to provide a DNS preload query to the terminal for the respective domain,
wherein the one or more processors are further configured to receive one or more preload DNS queries from the CPE for one or more of the domains listed in the preload list based on the particular times specified in the time schedule for the respective one or more domains, and
wherein the one or more processors are further configured to provide preload records to the CPE in response to the one or more preload DNS queries for storage within a DNS cache of the CPE, and for resolving DNS queries of applications of the CPE.

14. The terminal of claim 13, wherein the one or more processors are further configured to receive a registration request from the CPE, to create a context containing a unique client ID for the CPE, and to provide a registration acknowledgement containing the client ID to the CPE.

15. The terminal of claim 13, wherein, as part of the performing of the analysis, the one or more processors are further configured to generate one or more of statistical data and predictive data regarding DNS usage and time for the CPE, and to track an expiration time for each DNS record based, at least in part, on a time to live parameter in the DNS record.

16. The terminal of claim 13, wherein the one or more processors are further configured to derive correlations between domains and time accessed by the CPE, wherein the generation of the preload list is further based on the derived correlations.

17. The terminal of claim 13, wherein, as part of the receiving of the DNS queries, the one or more processors are further configured to examine contents of each DNS query identify a source IP address and domain name contained in the DNS query and forward the DNS query to a DNS server via the wireless network interface.

18. The terminal of claim 13, wherein, as part of the receiving of DNS records associated with the one or more DNS queries, the one or more processors are further configured to examine contents of each DNS record identify a destination IP address and domain name to IP address mappings contained in the DNS record.

\* \* \* \* \*